United States Patent [19]

Honda et al.

[11] Patent Number: 4,773,244

[45] Date of Patent: Sep. 27, 1988

[54] APPARATUS FOR PRODUCING A SUBSTRATE FOR A PHOTOCONDUCTIVE MEMBERS

[75] Inventors: Mitsuru Honda; Atsushi Koike, both of Chiba; Kyosuke Ogawa, Miye; Keiichi Murai, Chiba, all of Japan

[73] Assignee: Canon Kabushiki Kaisha, Tokyo, Japan

[21] Appl. No.: 927,873

[22] Filed: Nov. 7, 1986

[30] Foreign Application Priority Data

Nov. 8, 1985 [JP] Japan ................ 60-251662

[51] Int. Cl.[4] .............. B21B 45/00; B05B 13/02
[52] U.S. Cl. ............................ 72/46; 72/53; 118/320; 118/107; 118/326; 427/242; 29/424; 29/527.2; 51/317; 51/7
[58] Field of Search ............ 118/102, 107, 303, 312, 118/320, 326; 72/53, 46; 51/7, 317; 29/424, 527.2; 427/242

[56] References Cited

U.S. PATENT DOCUMENTS

| | | | |
|---|---|---|---|
| 163,857 | 6/1875 | Ells ............................ | 51/317 X |
| 1,328,603 | 1/1920 | Stirling ........................ | 51/7 |
| 2,774,678 | 12/1956 | Rodman ...................... | 118/308 X |
| 3,066,044 | 11/1962 | Samuel ........................ | 427/242 |
| 3,287,157 | 11/1966 | Brown, Jr. et al. .......... | 427/345 |
| 3,362,109 | 1/1968 | Wallace ....................... | 118/312 X |
| 3,498,547 | 3/1970 | Kern ............................ | 72/53 X |
| 3,574,658 | 4/1971 | Fulk et al. ................... | 72/53 X |
| 3,643,379 | 2/1972 | Testolin ....................... | 51/317 X |
| 3,653,239 | 4/1972 | Carpenter, Jr. .............. | 72/53 |
| 3,870,013 | 3/1975 | Wagner ....................... | 118/312 X |
| 4,045,591 | 8/1977 | Payne .......................... | 427/327 X |
| 4,096,300 | 6/1978 | William et al. .............. | 118/326 X |
| 4,099,989 | 7/1978 | Dorsey, Jr. .................. | 72/46 X |
| 4,100,782 | 7/1978 | Clay ............................ | 72/53 |
| 4,224,356 | 9/1980 | Singer ......................... | 427/34 |
| 4,258,084 | 3/1981 | Hayden, Sr. ................. | 72/53 X |
| 4,272,234 | 6/1981 | Tse .............................. | 118/303 X |
| 4,363,285 | 12/1982 | Yoshida ...................... | 118/303 X |
| 4,430,003 | 2/1984 | Beattie et al. ............... | 118/303 X |
| 4,604,881 | 8/1986 | Lienert ........................ | 72/53 |

FOREIGN PATENT DOCUMENTS

| | | | |
|---|---|---|---|
| 0197652 | 6/1967 | U.S.S.R. ..................... | 72/53 |
| 0724438 | 2/1955 | United Kingdom ......... | 72/53 |
| 2130126 | 5/1984 | United Kingdom ......... | 118/101 |

OTHER PUBLICATIONS

"The Airless Wheelabrator", American Foundry Equipment Co., Catalog No. 74, 1946, pp. 1-24.

Primary Examiner—Richard Bueker
Assistant Examiner—Alain Bashore
Attorney, Agent, or Firm—Fitzpatrick, Cella, Harper & Scinto

[57] ABSTRACT

An apparatus suitable for fabricating a substrate suitable for photoconductive members has a cylindrical rotating vessel surrounded by a housing which contains a plurality of rigid spheres therein. A substrate supporting means is placed within the cylindrical rotating vessel so as to be rotatable coaxially therewith. A supplying means for a surface coating liquid, such as polybutene, is placed at an upper position over the external wall face of the cylindrical rotating vessel. A reservoir for the surface coating liquid is placed at a lower position below the external wall face of the cylindrical rotating vessel. A means to circulate the surface coating liquid to the supplying means is employed.

17 Claims, 4 Drawing Sheets

APPARATUS FOR PRODUCING A SUBSTRATE FOR A PHOTOCONDUCTIVE MEMBERS

BACKGROUND OF THE INVENTION

1. Field of the Invention

This invention relates to an apparatus for treating the surface of a body to produce a surface-treated material which is suitably used as a constituting member for electric devices, electron devices, or especially as a substrate for the light receiving member in electrophotography.

2. Description of the Prior Art

There have been used metal bodies in plate form, cylindrical form, endless-belt form or the like as a substrate for photoconductive members such as the light receiving member in electrophotography. And for such metal bodies, they are required to have an appropriate surface to be suited for their uses.

Because of this, a surface treatment by the grinding work with means of a diamond cutting tool using lathe, milling cutter, etc. has been carried out for the surface of a metal body. As the metal body, there has been generally used aluminum alloy as the most preferable one. And in the conventional technique, aluminum alloy is subjected to said surface treatment, and an appropriate light receiving layer is formed on the treated surface of the aluminum alloy in accordance with the use purpose.

However, there exist various problems in the conventional surface treating technique. That is, during the surface treatment by grinding work with means of a diamond cutting tool using lathe, milling cutter, etc. in the conventional surface treating technique, intermetallic compounds such as Si-Al-Fe series compounds, Fe-Al series compounds, $TiB_2$ and the like, oxides of Al, Mg, Ti, Si and Fe and/or air holes due to $H_2$ gas are often generated within the alloy texture. In addition to these problems, there is another kind problem that a surface defect such as level difference at grain boundary which generates between adjacent aluminum textures having different crystal orientations is often brought about.

Further, in the conventional technique, as for the aluminum alloy for use in obtaining an appropriate substrate, it is necessary to have an extremely clean surface. However, a film composed of oxides having a thickness of up to 30 Å is apt to be easily formed on the surface of such kind aluminum alloy since its surface still remains active even under ultra-high vacuum condition of $10^{-9}$ mmHg.

Under these circumstances, a surface-treated material obtained in accordance with the known manner eventually becomes such that is likely to invite various problems and defects to the functions of a photoconductive member prepared by depositing a light receiving layer thereon.

For instance, in the case where it is a light receiving member for electrophotography, a light receiving layer formed on the surface of such material is apt to become such that is poor in layer uniformity and constituent homogeneity, and is unstable in electric, optical and photoconductive characteristics thereby bringing about defects in the images obtained.

This tendency is remarkable in the case where the light receiving layer is composed of an amorphous material consisting of silicon atoms or containing silicon atoms as the main constituent.

SUMMARY OF THE INVENTION

The present inventors have conducted extensive studies in order to solve the problems in the aforementioned conventional techniques and in order to develop a new manner for effectively and simply producing a surface-treated material which has a desirable surface shape to be suited as a constituting member for electric devices, electron devices, and especially as a substrate for the light receiving member in electrophotography.

As a result, the present inventors finally have found a manner that enables one to efficiently and stably produce said surface-treated material having a particular uneven surface shape provided with irregularities composed of a plurality of fine spherical dimples in simplified particular procedures as detailed below.

It is therefore an object of this invention to provide an apparatus for producing a desirable surface-treated material which is usable as a constituting member for electric devices, electron devices, and especially as a substrate for the light receiving member in electrophotography.

Another object of this invention is to provide an apparatus for producing a surface-treated substrate having a particular uneven-shaped surface provided with irregularities composed of a plurality of fine spherical dimples which enables one to prepare a desirable photoconductive member having a photoconductive layer being wealthy in practically applicable characteristics; being free from any problem due to rest potential, being constantly stable in electric, optical and photoconductive properties, having a high light fatigue resistance, a high durability and a high moisture resistance, and being not deteriorated upon repeating use.

Further object of this invention is to provide an apparatus for producing a surface-treated substrate having a particular uneven-shaped surface provided with irregularities composed of a plurality of fine spherical dimples which enables one to prepare a desirable light receiving member for electrophotography having a light receiving layer composed of an amorphous material containing silicon atoms as a main constituent and, if necessary, hydrogen atoms(H) and/or halogen atoms (X) [hereinafter referred to as "a-Si(H,X)"] which is replete in the above-mentioned practically applicable characteristics and has a function of effectively preventing the occurrence of interference fringe in the formed images due to the interference phenomenon thereby forming visible images of excellent quality even in the case of using coherent laser beams possible producing interference as a light source.

DETAILED DESCRIPTION OF THE INVENTION

The present inventors have made earnest studies for overcoming the foregoing problems on the conventional substrate (support) for electric devices, electron devices, and especially for the light receiving member in electrophotography and attaining the objects of this invention as described above and, as a result, have accomplished this invention based on the findings as below described.

That is, one of the findings is that when rigid true spheres are dropped gravitationally onto the surface of a relevant aluminum alloy body to be a substrate, for instance, for the light receiving member in electrophotography, there can be obtained a desirable surface-treated material having an uneven-shaped surface provided with irregularities composed of a plurality of fine spherical dimples which is accompanied with neither any intermetallic compound nor any metal oxide, which has not any presence of a hole due to $H_2$ gas and which has not any occurrence of surface defects such as level difference at grain boundary respectively observed in the conventional substrate.

Another finding is that when the above surface treating process is carried out in the presence of a liquid containing a long chain molecular hydrocarbon such as polybutene, no oxide film is formed on the surface of the aluminum alloy body.

Further finding is that when a light receiving layer composed of a-Si(H,X) is deposited on the thus resulting substrate to obtain a light receiving member for use in electrophotography by glow discharging manner, there can be obtained a desirable light receiving member having a uniform and homogeneous light receiving layer being wealthy in practically applicable characteristics. That is, in the light receiving member thus obtained, lights passed through the light receiving layer reflect on the layer interface and at the surface of the substrate and interfere each other to effectively prevent images to be obtained from being accompanied with interference fringe patterns thereby enabling one to make images excellent in quality.

This invention has been completed on the basis of the above findings, and it provides an apparatus for producing a surface-treated material having a particular surface shape provided with irregularities composed of a plurality of fine spherical dimples which is indeed suitable for use in electric devices, electron devices and especially suitably usable as a substrate for the light receiving member in electrophotography, characterized in that a plurality of rigid spheres of even surface or uneven surface having almost the same diameter or different diameters are let falling from almost the same height onto the surface of a body to be said surface-treated material in the state of having been entirely coated with a liquid containing polybutene (hereinafter referred to as "coating liquid") to make the body surface to be in an uneven shape provided with irregularities composed of a plurality of fine spherical dimples.

The body for use in surface treatment by the apparatus of this invention may be either electroconductive or electrically insulative.

The electroconductive body can include, for example, metals such as NiCr, stainless steels, Al, Cr, Mo, Au, Nb, Ta, V, Ti, Pt and Pb or the alloys thereof.

The electrically insulative body can include, for example, films or sheets of synthetic resins such as polyester, polyethylene, polycarbonate, cellulose acetate, polypropylene, polyvinyl chloride, polyvinylidene chloride, polystyrene, and polyamide, glass, ceramic and paper. It is preferred that the electrically insulative support is applied with electroconductive treatment to at least one of the surfaces thereof and disposed with a light receiving layer on the thus treated surface.

In the case of glass, for instance, electroconductivity is applied by disposing, at the surface thereof, a thin film made of NiCr, Al, Cr, Mo, Au, Ir, Nb, Ta, V, Ti, Pt, Pd, $In_2O_3$, $SnO_2$, ITO ($In_2O_3+SnO_2$), etc. In the case of the synthetic resin film such as a polyester film, the electroconductivity is provided to the surface by disposing a thin film of metal such as NiCr, Al, Ag, Pv, Zn, Ni, Au, Cr, Mo, Ir, Nb, Ta, V, Tl and Pt by means of vacuum deposition, electron beam vapor deposition, sputtering, etc. or applying lamination with the metal to the surface. The support may be of any configuration such as cylindrical, belt-like shape, which can be properly determined depending on the application uses. For instance, in the case of using the light receiving member as image forming member for use in electronic photography, it is desirably configurated into an endless belt or cylindrical form in the case of continuous high speed reproduction. The thickness of the support member is properly determined so that the light receiving member as desired can be formed. In the case flexibility is required for the light receiving member, it can be made as thin as possible within a range capable of sufficiently providing the function as the substrate. However, the thickness is usually greater than 10 um in view of the fabrication and handling or mechanical strength of the substrate.

The rigid sphere of even surface or uneven surface (usually $\phi=0.4$-$2.0$ mm) to be used for forming the uneven shape as described above at the support surface can include, for example, various kinds of rigid spheres made of stainless steels, aluminum, steels, nickel and brass and like other metals, ceramics and plastics. Among all, rigid spheres of stainless steels or steels are preferred in view of the durability and the reduced cost. The hardness of such sphere may be higher or lower than that of the support.

However, in the case of using the rigid sphere repeatedly used, it is desired that the hardness is higher than that of the support.

As for the coating liquid to be used for coating the body, it is required to uniformly coat the entire surface of the body with a thinner liquid coat as much as possible. Then the liquid coat is necessary to be easily solidified. The solidified liquid coat is necessary to be easily and completely washed out in washing process. Further, in dry-finishing process it is necessary that neither any dry unevenness nor any residue be left to bring about a surface-treated material in the absolute clean state.

In this connection, the coating liquid is required to satisfy the following (a) to (e) conditions; (a) that is a viscous liquid, (b) that has an insulative property, (c) that has a coating action, (d) that the resulting coat can be easily washed out with a solvent and (e) that after the removal of the solidified coat the surface of the surface-treated material is in an absolute clean state.

As the coating liquid to satisfy all the above conditions, a liquid prepared by dissolving a long chain molecular hydrocarbon in a relevant solvent can be mentioned as a preferred example.

As typical examples for the long chain molecular hydrocarbon, there are polybutenes. Among the polybutenes, those represented by the following general formula are preferred;

wherein n is an integral number of 3 to 40. And among the polybutenes represented by the above general formula, those of which n is 3 to 20 are most preferred.

Further, among the most preferred polybutenes there are some which satisfy all the foregoing conditions themselves. In that case, the coating liquid can be substantially consisted of that kind polybutene.

As for the solvent to be used for preparing the coating liquid, any organic solvent can be employed as long as it disolves the long chain molecular hydrocarbon to obtain the coating liquid which satisfies the foregoing (a) to (e) conditions.

Usable as the organic solvent are, for example, ether, heptane, toluene, trichloroethylene, trichloroethane and the like. And among these organic solvents, trichloroethane is most preferable. That is, when trichloroethane is used, the foregoing polybutene can be easily and effectively dissolved therein to obtain a desirable coating liquid which is malleable and coats the entire body surface uniformly with an even and extremely thin liquid coat which does not give any hindrance for the formation of an uneven shape composed of a plurality of fine spherical dimples at the body surface by the falling rigid spheres thereonto and brings about sooner solidification of the liquid coat after the uneven shape formation toward the body surface. And using said coating liquid in washing process results in washing out the solidified coat effectively and completely to lead to obtaining a desirable surface-treated material having an absolute clean uneven shaped surface provided with irregularities composed of a plurality of fine spherical dimple without any unevenness and any residue due to the coat in the successive drying process.

And, as for the coating liquid composed of said polybutene and trichloroethane, the constituting ratio of the two substances is an important factor. The constituting ratio of said polybutene versus trichloroethane is preferably in the range of 1:4 to 4:1 and most preferably 1:1.

DESCRIPTION OF THE PREFERRED EMBODIMENTS

Explanation will be then made to embodiments of the apparatus of this invention for producing a surface-treated material having an uneven shaped surface provided with irregularities composed of fine spherical dimples which referring to the drawings, but this invention is not intended to limit only thereto.

Figure 1:
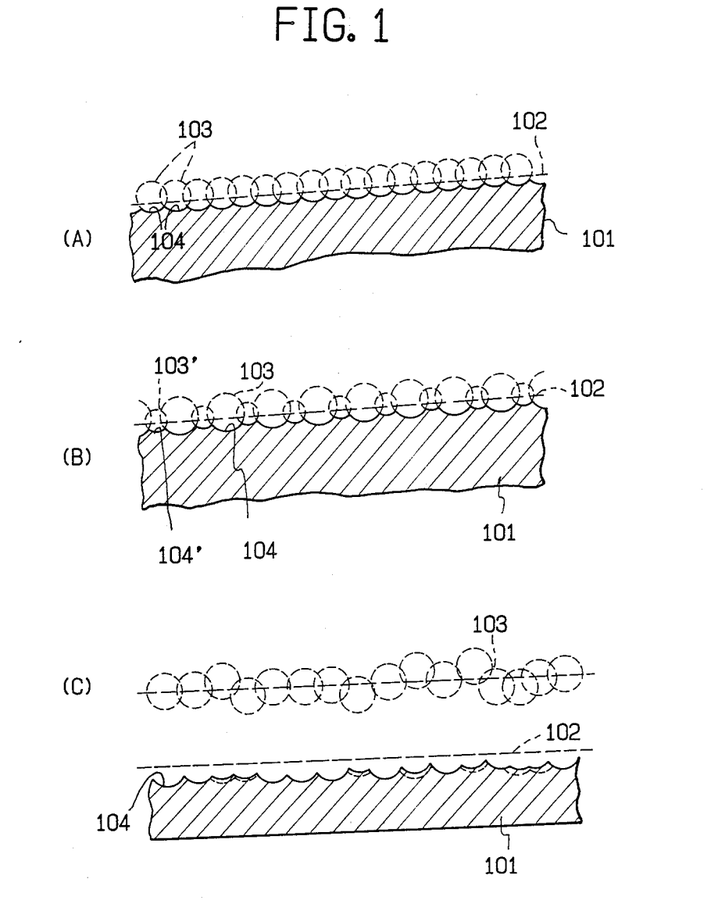
FIGS. 1(A) through 1(C) are schematic views respectively for illustrating the uneven shape at the surface of a substrate to be obtained according to this invention.

FIGS. 1(A) through 1(C) show several typical embodiments of substrates formed with the uneven shape composed of a plurality of spherical dimples at the surface according to this invention, in which explanation on the coating liquid is omitted for simplification purpose.

In the embodiments shown in FIG. 1(A), a plurality of dimples pits 104, 104 . . . substantially of an identical radius of curvature and substantially of an identical width are formed while being closely overlapped with each other thereby forming an uneven shape regularly by causing to fall a plurality of spheres 103, 103, . . . regularly substantially from an identical height to different positions at the surface 102 of the body 101. In this case, it is naturally required for forming the dimples 104, 104, . . . overlapped with each other that the spheres 103, 103, . . . are gravitationally dropped such that the times of collision of the respective spheres 103 to the surface 102 are displaced from each other.

Further, in the embodiment shown in FIG. 1(B), a plurality of dimples 104, 104', . . . having two kinds of radius of curvature and two kinds of width are formed being densely overlapped with each other to the surface 102 of the body 101 thereby forming an unevenness with irregular height at the surface by dropping two kinds of spheres 103, 103', . . . of different diameters from the heights substantially identical with or different from each other.

Furthermore, in the embodiment shown in FIG. 1(C) (front elevational and cross-sectional views for the body surface), a plurality of dimples 104, 104, . . . substantially of an identical radius of curvature and plural kinds of width are formed while being overlapped with each other thereby forming an irregular unevenness by causing to fall a plurality of spheres 103, 103, . . . substantially of an identical diameter from substantially identical height irregularly to the surface 102 of the body 101.

As described above, uneven shape composed of the spherical dimples can be formed by dropping the rigid spheres onto the support surface. In this case, a plurality of spherical dimples having desired radius of curvature and width can be formed at a predetermined density on the support surface by properly selecting various conditions such as the diameter of the rigid spheres, falling height, hardness for the rigid true sphere and the body surface or the amount of the fallen spheres. That is, the height and the pitch of the uneven shape formed on the support surface can optionally be adjusted depending on the purpose by selecting various conditions as described above thereby enabling to obtain a substrate having a desired uneven shape on the surface.

Figure 2:
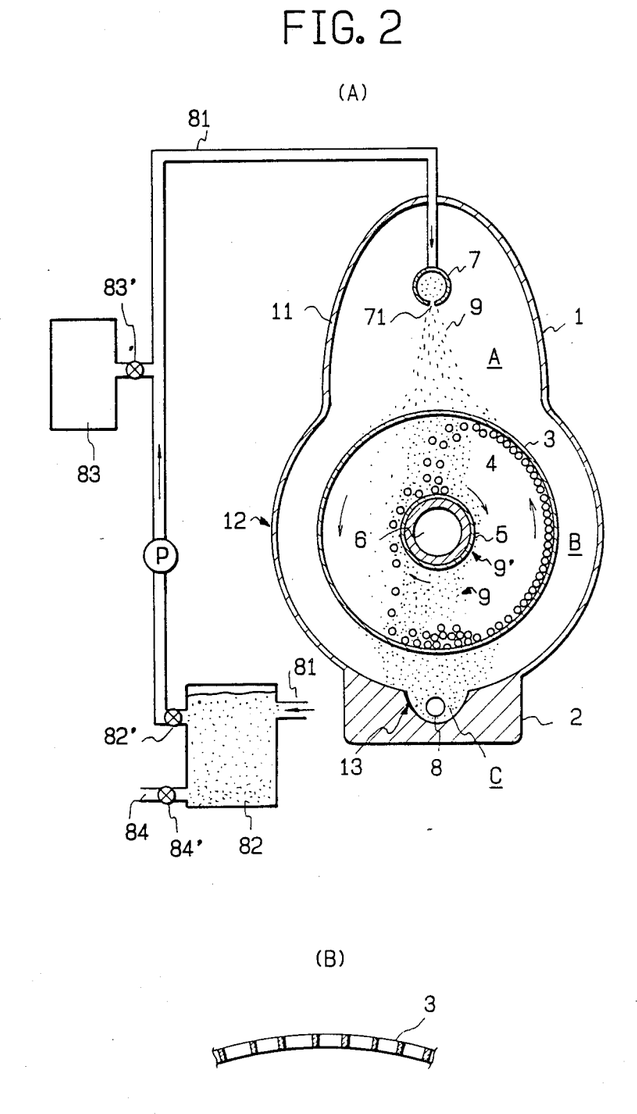
FIG. 2(A) is a cross-sectional view schematically illustrating a constitutional example of the apparatus for producing a surface-treated substrate according to this invention.
FIG. 2(B) is an enlarged portion view of the surrounding wall of the cylindrical rotating vessel of the apparatus shown in FIG. 2(A).

FIG. 2(A) is a cross-sectional view schematically illustrating a constitutional example of the apparatus for producing a surface-treated substrate according to this invention, and FIG. 2(B) is an enlarged portion view of the surrounding wall of the cylindrical rotating vessel of the apparatus shown in FIG. 2(A).

Figure 3:
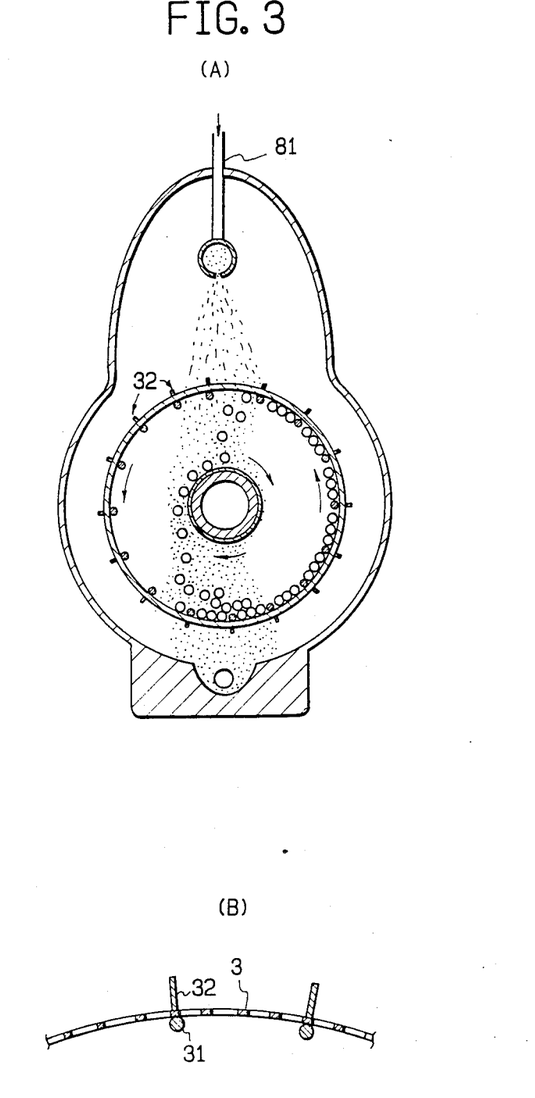
FIG. 3(A) is a cross-sectional portion view schematically illustrating a modified example of the apparatus as shown in FIG. 2(A)
FIG. 3(B) is an enlarged portion view of the surrounding wall of the cylindrical rotating vessel in the apparatus as shown in FIG. 3(A).

FIG. 3(A) is a cross-sectional portion view schematically illustrating a modified example of the apparatus as shown in FIG. 2(A); and FIG. 3(B) is an enlarged portion view of the surrounding wall of the cylindrical rotating vessel in the apparatus as shown in FIG. 3(A).

Figure 4:
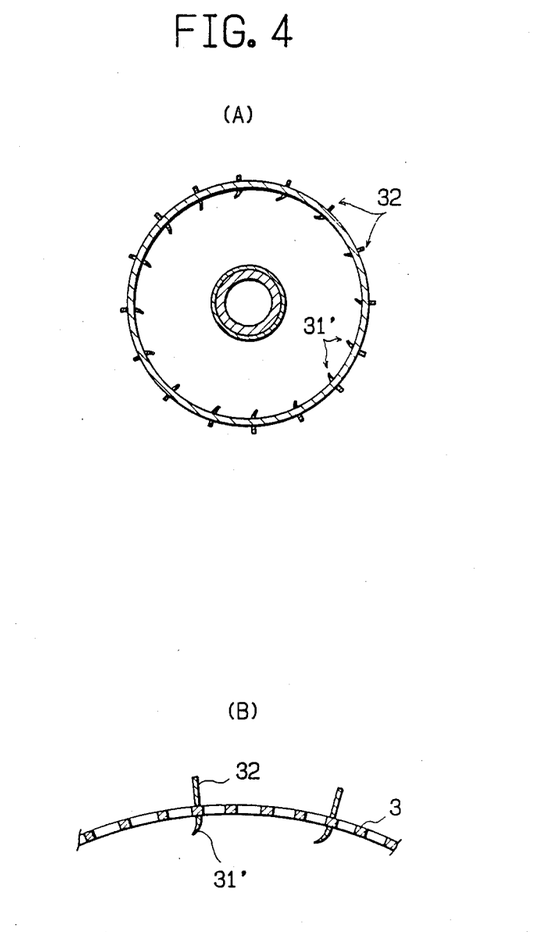
FIG. 4(A) is a cross-sectional portion view schematically illustrating a modified example of the apparatus as shown in FIG. 3(A)
FIG. 4(B) is an enlarged portion view of the surrounding wall of the cylindrical rotating vessel in the apparatus as shown in FIG. 4(A).

FIG. 4(A) is a cross-sectional portion view schematically illustrating a modified example of the apparatus as shown in FIG. 3(A); and FIG. 4(B) is an enlarged portion view of the surrounding wall of the cylindrical rotating vessel in the apparatus as shown in FIG. 4(A).

Referring to FIGS. 2(A) and 2(B), surrounding wall 1 has upper part 11 in oval form of a cross section which is forming space A of an oval form in the inside and lower part 12 in a round form of a cross section which is forming space B of a round form in the inside. In the middle at the bottom part of the space B, there is provided a downward projected semicircular part 13 which is forming space C. The surrounding wall 1 is unitedly formed while being completely sealed by a metal plate such as stainless steel which has a resistance against pressure, heat and chemicals.

The entire of the surrounding wall 1 makes a housing being long from side to side at the external appearance and the both sides of the housing are fixedly sealed by appropriate side walls (not shown).

The device is supported by supporting base 2 wherein the downward projected semicircular part 13 is buried in the supporting base 2 so as to fixedly support the entire of the device thereby.

In the middle of the space B, there is installed cylindrical rotating vessel 3 which is made up unitedly of a perforated metal plate such as panching metal. Both sides of the rotating vessel 3 are respectively rotatably supported by the corresponding side wall of the housing. One side of the rotating vessel 3 is connected to an appropriate drive means such as a motor (not shown) so that it can be rotated around the axial center. The rotating vessel 3 contains rigid true spheres or rigid spheres of an uneven surface shape 4, 4, . . . , which are carried while riding on the inner face of the surrounding wall of the rotating vessel up to the rotation top part by the action of perforated irregularities of the surrounding wall and the centrifugal force of the rotating vessel then gravitationally dropped onto the surface of a body (aluminum cylinder for a substrate) in cylindrical form 5 as shown in FIG. 3(A). The body is supported on rotating shaft 6 being connected to a drive means such as motor coaxially with the rotating vessel 3 at the side wall of the housing (not shown). At the upper middle position in the space A, there is placed coating liquid spraying pipe 7 having holes 71, 71, . . . to allow the coating liquid to be jetting-like downward sprayed, which is extended linearly crossing the horizontal length of the space A above and over the rotating vessel 3.

An opening 8 coating liquid conveying pipe 81 is provided to the space C. The coating liquid conveying pipe 81 is connected to the coating liquid spraying pipe 7 through an appropriate pump means. Liquid storing tank 82 is employed with which exhausting pipe 84 having an appropriate valve means 84' is provided at the bottom part. In the storing tank 82, the coating liquid conveyed from the device is clarified by settling sediments such as fine metal particles caused during the surface treatment operation, which are exhausted together with a liquid through the exhausting pipe 84. A new coating liquid in the amount of the exhausted liquid is supplied into the system from reservoir 83 through conduit 83' having an appropriate valve means.

The coating liquid is necessary to be replaced entirely after a predetermined number of cycles. In that case, the entire used coating liquid is exhausted through the exhausting pipe 84 by opening the valve means 84' while closing valve means 82', and thereafter a new coating liquid in a predetermined amount is supplied into the system from the reservoir 83 in the same way as previously described.

An example of producing a surface-treated material by operating the apparatus as shown in FIG. 2(A) is now explained.

Firstly, a body in cylindrical form such as aluminum alloy cylinder 5 is placed on the rotating shaft 6 in the rotating vessel 3 containing a plurality of the rigid spheres 4, 4, . . . , then a coating liquid [for example, composed of polybutene and trichloroethane (1:1)] in a predetermined amount is introduced into the system from the reservoir 83 and sprayed over the surrounding wall of the rotating vessel 3 through the spraying holes 71, 71, . . . of the spraying pipe 7 in the way as shown in FIG. 2(A) in which the spraying situation of the coating liquid is represented by numerical number 9. The coating liquid thus supplied is successively passed through the perforations of the surrounding wall of the rotating vessel 3 and flowed down onto the surface of the body 5 thereby coating it with a thin liquid coat. The residual coating liquid is further flowed down to soak the rigid spheres existing in the bottom part of the rotating vessel 3 then passed through the perforations of the surrounding wall of the rotating vessel 3 into the space C. The coating liquid gathered therein is conveyed into the liquid storing tank 82 then recycled to the spraying pipe by the action of the pump means. It is a matter of course that after the introduction of the coating liquid in a predetermined amount into the system, the valve means 83' is closed to stop the supply of the coating liquid from the reservoir 83. Then the rotation of the rotating vessel 3 and that of the rotating shaft are started, wherein the former is rotated in the opposite direction to the latter respectively in the way as shown by the arrow mark in FIG. 2(A). The rotating speed of the rotating vessel 3 is properly determined and controlled while considering that the rigid spheres 4, 4, . . . can be appropriately lifted up to the top part along the inner face of the surrounding wall of the rotating vessel 3 to allow those rigid spheres to be gravitationally fallen onto the surface of the body 5. On the other hand, the rotating speed of the rotating shaft 6 is properly determined and controlled while considering the density of the spherical dimples to be formed and the amount of rigid spheres supplied.

As above explained, the formation of an even shape provided with irregularities composed of fine spherical dimples to the surface of the body is carried out while coating the entire surface of the body with a thinner liquid coat. The operation of the surface treatment may be carried out at room temperature under atmospheric pressure condition. However in the case when it is desired to make the rigid spheres strongly collided against the surface of the body, said operation is preferred to carry out under reduced pressure condition.

After the passage of a predetermined time period, when the rotation of the rotating vessel and that of the rotating shaft are stopped and at the same time the supply of the coating liquid is stopped, there is brought about a surface-treated product having an uneven shaped surface provided with irregularities composed of fine spherical dimples which is entirely coated with a thinner solidified coat. The product is taken out from the apparatus, and may be stored in stable state without having any problem even at an appropriate open place even in the case of an aluminum alloy cylinder until it is used since its entire surface is prevented from being contacted with air by the solidified coat placed thereon.

In the apparatus of this invention, a desirable surface treated can be continuously produced by placing a new body to be treated in the system and commencing the above operation after the once obtained product has been taken out from the apparatus.

The above example is directed to the case of one body, but it is possible for the apparatus of this invention to be so structured that plural bodies may be treated at the same time.

Further, for practical use of the surface-treated product having a thinner solidified coat thereon resulted from the apparatus, it is first subjected to washing with an appropriate solvent to remove the solidified coat therefrom followed by dryness, and the material thus obtained is brought into a deposition chamber (not shown) for forming a light receiving layer on its absolutely clean uneven-shaped surface in any case.

Therefore, in the case where necessary, the above washing process may be conducted in the apparatus as shown in FIG. 2(A). In that case, after the surface treatment operation having been terminated, the entire coating liquid remaining in the system is exhausted therefrom, and a washing liquid such as trichloroethane is supplied from a reservoir (not shown) to the spraying pipe 7 through the liquid conveying pipe 81 to be downward jetting-like sprayed through spraying holes 71, 71, . . . while the rotation of the rotating vessel being stopped but the rotating shaft on which a surface treated body coated with a thinner liquid coat or a thinner solidified coat being placed being rotated properly. The washing liquid gathered in the space C can be recycled for repeated use. Otherwise it is exhausted outside the system through the exhausting pipe 84 while the valve means 82' being closed and the valve means 84' being opened.

FIG. 3(A) is a cross-sectional portion view schematically illustrating a modified example of the apparatus as shown in FIG. 2(A); and FIG. 3(B) is an enlarged portion view of the surrounding wall of the cylindrical rotating vessel in the apparatus as shown in FIG. 3(A).

In the apparatus of this invention as shown in FIGS. 3(A) and 3(B), liquid flow stopping bars 32, 32, . . . are fixedly disposed horizontally in the longitudinal direction on the external surface of the surrounding wall of the rotating vessel 3 and rigid sphere holding bars 31, 31, . . . are fixedly disposed horizontally in the longitudinal direction on the inner surface of said surrounding wall.

The operation of the apparatus of this invention as shown in FIGS. 3(A) and 3(B) is conducted in the same way as in the apparatus as shown in FIGS. 2(A) and 2(B) except that the inflow of the coating liquid into the rotating vessel 3 is more effectively proceeded by the actions of the liquid flow stopping bars 32, 32, . . . and lifting the rigid spheres 4, 4, . . . is more effectively proceeded by the actions of the rigid sphere holding bars 31, 31, . . .

FIG. 4(A) is a cross-sectional portion view schematically illustrating a modified example of the apparatus as shown in FIG. 3(A); and FIG. 4(B) is an enlarged portion view of the surrounding wall of the cylindrical rotating vessel in the apparatus as shown in FIG. 4(A).

In the apparatus of this invention as shown in FIGS. 4(A) and 4(B), the rigid sphere holding bars 31, 31, . . . in the apparatus as shown in FIGS. 3(A) and 3(B) are replaced by blade-like form bars 31', 31', . . .

In this apparatus, lifting the rigid spheres 4, 4, . . . are further effectively proceeded and at the same time releasing those rigid spheres at the rotation top part of the rotating vessel 3 and their falling can be more properly conducted.

As above detailed, according to the apparatus of this invention there can be obtained a desirable surface-treated material that fine spherical dimples following the shape of a rigid spheres are formed with the surface without leaving plane part and the surface is entirely coated with a solid coat caused by the coating liquid so that the surface provided with irregularities composed of fine spherical dimples is prevented from being in contact with air thereby it being always kept in a stable state. Washing with a solvent such as trichloroethane invites an effective elution of the solid coat and the result after dryness gives a desirable surface-treated material having an absolute clean surface provided with irregularities composed of a plurality of fine spherical dimples which is indeed suitable as a substrate for photoconductive members.

In fact, it has been found as a result of the comparative test that the surface-treated substrate obtained in accordance with the apparatus is superior to another kind surface-treated substrate having an uneven-shaped surface provided with irregularities composed of fine spherical dimples which was obtained in accordance with the apparatus of this invention without using any coating liquid.

In the comparative test, a film composed of a-Si : H : X was formed on the surface of each substrate, and the resulting two members were subjected to imagewise exposure by irradiating laser beams at 780 nm wavelength and with 80 $\mu$m of spot diameter using known image exposing device and images were obtained by subsequent development and transfer. The state of the occurrence of an interference fringe on thus obtained images was observed and evaluated for each member. As a result, it was found that the former member is superior to the latter member.

What is claimed is:

1. An apparatus for fabricating a substrate suitable for photoconductive members comprising a cylindrical rotating vessel having an external wall face and an inner wall face surrounded by a housing, said rotating vessel containing a plurality of freely movable rigid spheres therein to surface treat said substrate, a substrate supporting means being placed within said cylindrical rotating vessel so as to be rotatable coaxially therewith, a supplying means of a surface coating liquid being placed at an upper position above the external wall face of said cylindrical rotating vessel, a storing tank for said surface coating liquid being placed at a lower position below the external wallfoil of said cylindrical rotating vessel, and a means to circulate said surface coating liquid to said supplying means, said cylindrical rotating vessel having a plurality of perforations through which the smooth passage of said surface coating liquid is permitted.

2. An apparatus for fabricating a substrate suitable for photoconductive members according to claim 1, wherein the inner wall face of the cylindrical rotating vessel is provided with an appropriate number of means to hold the rigid spheres.

3. An apparatus for fabricating a substrate suitable for photoconductive members according to claim 1, wherein the external wall face of the cylindrical rotating vessel is provided with an appropriate number of liquid stopping means for the surface coating liquid.

4. An apparatus for fabricating a substrate suitable for photoconductive members according to claim 1, wherein the inner wall face of the cylindrical rotating vessel is provided with an appropriate number of means to hold the rigid sphere and the external wall face thereof is provided with an appropriate number of liquid flow stopping bars for the surface coating liquid.

5. An apparatus for fabricating a substrate suitable for photoconductive members according to claim 1 including a surface coating liquid which dries to uneven surface and does not impart any residue to the substrate.

6. An apparatus for fabricating a substrate suitable for photoconductive members according to claim 5, wherein the surface coating liquid is polybutene or a liquid of polybutene resolved in an organic solvent.

7. An apparatus for fabricating a substrate suitable for photoconductive members according to claim 6, wherein the organic solvent is a member selected from the group consisting of ether, heptane, toluene, trichloroethane and trichloroethylene.

8. An apparatus for fabricating a substrate suitable for photoconductive members comprising: (a) a housing; (b) a cylindrical rotating vessel within said housing containing a plurality of freely movable rigid spheres to surface treat said substrate and said rotating vessel having a perforated wall for smoothly passing therethrough a surface coating liquid; (c) a substrate supporting means spaced within said cylindrical rotating vessel so as to be coaxially rotatable therewith; and (d) supplying means for said surface coating liquid being spaced above the perforated wall of said cylindrical rotating vessel for delivering said surface coating liquid to the perforated wall.

9. The apparatus of claim 8 wherein the cylindrical rotating vessel has an inner wall surface having an appropriate number of means to hold the rigid spheres.

10. The apparatus of claim 8, wherein the outer wall of the cylindrical rotating vessel has an appropriate number of liquid stopping means for the surface coating liquid.

11. The apparatus of claim 8, wherein the inner wall surface of the cylindrical rotating vessel is provided with an appropriate number of means to hold the rigid spheres and the outer wall thereof is provided with an appropriate number of liquid flow stopper bars for the surface coating liquid.

12. The apparatus of claim 8, wherein the surface coating liquid dries to an uneven surface and does not impart any residue to the substrate.

13. The apparatus according to claim 12, wherein the surface coating liquid is polybutene or a liquid form of polybutene in an organic solvent.

14. The apparatus according to claim 13, wherein the organic solvent is a member selected from the group consisting of ether, heptane, toluene, trichloroethane and trichloroethylene.

15. The apparatus according to claim 8, including a storage tank for said surface coating liquid.

16. The apparatus according to claim 15, including means to circulate said surface coating liquid from said storage tank to said supply means.

17. An apparatus for fabricating a substrate suitable for photoconductive members comprising:
(a) a cylindrical rotating vessel, with an inner and outer wall face, having a plurality of perforations, through which the smooth passage of a surface coating liquid is allowed to pass through, and which said cylindrical rotating vessel contains a plurality of free moving rigid spheres to surface treat said surface;
(b) a supplying means of the surface coating liquid being placed at an upper position over the outer wall face, said supplying means facing said external wall and not within the cylindrical rotating vessel; and
(c) a substrate supporting means placed inside said cylindrical rotating vessel so that said supporting means is rotatable coaxially therewith.

* * * * *

UNITED STATES PATENT AND TRADEMARK OFFICE
CERTIFICATE OF CORRECTION

PATENT NO. : 4,773,244
DATED : September 27, 1988
INVENTOR(S) : MITSURU HONDA, ET AL.

It is certified that error appears in the above-identified patent and that said Letters Patent is hereby corrected as shown below:

IN [54] TITLE

"A" (second occurrence) should be deleted.

COLUMN 1

Line 3, "A" (second occurrence) should be deleted.

COLUMN 2

Line 31, "wealthy" should read --replete--.
Line 37, "Further" should read --A further--.
Line 45, "atoms(H)" should read --atoms (H)--.
Line 53, "possible" should read --possibly--.

COLUMN 3

Line 43, "wealthy" should read --replete--.
Line 47, "interfere" should read --interfere with--.
Line 62, "falling" should read --fall--.

UNITED STATES PATENT AND TRADEMARK OFFICE
CERTIFICATE OF CORRECTION

PATENT NO. : 4,773,244

DATED : September 27, 1988

INVENTOR(S) : MITSURU HONDA, ET AL.

It is certified that error appears in the above-identified patent and that said Letters Patent is hereby corrected as shown below:

COLUMN 5

Line 11, "preferred;" should read --preferred:--.
    Line 25, "consisted" should read --composed--.
    Line 28, "disolves" should read --dissolves--.
    Line 48, "uneven shaped" should read --uneven-shaped--.
    Line 50, "dimple" should read --dimples--.
    Line 60, "then" should read --now--.
    Line 62, "uneven shaped" should read --uneven-shaped--.
    Line 64, "which" should read --while--.

COLUMN 7

Line 9, "entire" should read --entirety--.
    Line 16, "entire" should read --entirety--.
    Line 42, "opening 8 coating" should read --opening 8 of coating--.

COLUMN 8

Line 25, "rotating shaft" should read --rotating shaft 6--.
    Line 48, "carry" should read --be carried--.
    Line 53, "uneven" should read --uneven- --.

UNITED STATES PATENT AND TRADEMARK OFFICE
CERTIFICATE OF CORRECTION

PATENT NO. : 4,773,244

DATED : September 27, 1988

INVENTOR(S) : MITSURU HONDA, ET AL.

It is certified that error appears in the above-identified patent and that said Letters Patent is hereby corrected as shown below:

COLUMN 9

Line 7, "dryness," should read --drying,--.

COLUMN 10

Line 38, "surface treat" should read --surface-treat--.
    Line 45, "wallfoil" should read --wall face--.
    Line 66, "sphere" should read --spheres--.

COLUMN 11

Line 2, "claim 1" should read --claim 1,--.
    Line 3, "uneven" should read --an uneven--.
    Line 18, "surface treat" should read --surface-treat--.
    Line 27, "claim 8" should read --claim 8,--.

UNITED STATES PATENT AND TRADEMARK OFFICE
CERTIFICATE OF CORRECTION

PATENT NO. : 4,773,244

DATED : September 27, 1988

INVENTOR(S) : MITSURU HONDA, ET AL.

Page 4 of 4

It is certified that error appears in the above-identified patent and that said Letters Patent is hereby corrected as shown below:

COLUMN 12

Line 26, "surface" should read --surface- --.
Line 27, "surface;" should read --substrate;--.

Signed and Sealed this

Third Day of April, 1990

Attest:

HARRY F. MANBECK, JR.

Attesting Officer

Commissioner of Patents and Trademarks